(12) United States Patent
Johannessen et al.

(10) Patent No.: US 7,964,163 B2
(45) Date of Patent: Jun. 21, 2011

(54) HIGH DENSITY STORAGE OF AMMONIA

(75) Inventors: Tue Johannessen, Glostrup (DK);
Christensen Claus Hviid, Lynge (DK);
Norskov Jens Kehlet, Holte (DK);
Sorensen Rasmus Zink, Vedbaek (DK);
Quaade Ulrich, Bagsvaerd (DK)

(73) Assignee: Amminex A/S, Soborg (DK)

( * ) Notice: Subject to any disclaimer, the term of this patent is extended or adjusted under 35 U.S.C. 154(b) by 0 days.

(21) Appl. No.: 12/577,921

(22) Filed: Oct. 13, 2009

(65) Prior Publication Data

US 2010/0024403 A1 Feb. 4, 2010

Related U.S. Application Data

(62) Division of application No. 11/815,146, filed as application No. PCT/DK2006/000059 on Feb. 3, 2006.

(51) Int. Cl.
*B01J 8/02* (2006.01)
*B01D 53/34* (2006.01)
*B01D 53/58* (2006.01)

(52) U.S. Cl. ........ 422/601; 422/600; 422/177; 422/211; 423/212; 423/239.1; 423/213.2; 60/286; 60/301

(58) Field of Classification Search ................ 422/177, 422/189, 190, 600, 601, 211; 423/212, 239.1, 423/213.2; 60/301, 286
See application file for complete search history.

(56) References Cited

U.S. PATENT DOCUMENTS

| | | | |
|---|---|---|---|
| 2,019,356 A | 10/1935 | Normelli | |
| 2,431,470 A | 11/1947 | Fawkes | |
| 3,342,557 A * | 9/1967 | Metaizeau | 423/507 |
| 3,510,357 A | 5/1970 | Nielson | |
| 3,669,743 A | 6/1972 | Swindells | |
| 3,812,236 A * | 5/1974 | Adams et al. | 423/237 |
| 4,190,622 A * | 2/1980 | Landis | 264/14 |
| 4,478,177 A * | 10/1984 | Valdespino | 123/3 |
| 4,480,595 A * | 11/1984 | Hobby et al. | 123/1 A |
| 4,750,453 A * | 6/1988 | Valdespino | 123/3 |
| 4,848,994 A | 7/1989 | Rockenfeller | |
| 5,384,101 A | 1/1995 | Rockenfeller | |
| 5,408,847 A | 4/1995 | Erickson | |
| 5,441,716 A | 8/1995 | Rockenfeller | |
| 5,628,205 A * | 5/1997 | Rockenfeller et al. | 62/480 |
| 5,809,775 A * | 9/1998 | Tarabulski et al. | 60/274 |

(Continued)

FOREIGN PATENT DOCUMENTS

DE 647254 7/1937

(Continued)

OTHER PUBLICATIONS

Danish Examination Report P 2005 00367 dated Nov. 28, 2005.

(Continued)

*Primary Examiner* — Walter D Griffin
*Assistant Examiner* — Huy-Tram Nguyen
(74) *Attorney, Agent, or Firm* — Frost Brown Todd LLC (57) ABSTRACT

A solid ammonia storage and delivery material comprising an ammonia absorbing/desorbing solid material, said storage and delivery material having been compacted to a density above 50% of the theoretic skeleton density provides a solid ammonia storage material which is easy to produce and handle and has a very high density of stored ammonia which is readily released under controlled conditions even though the porosity of the material is very low, and which storage material is safe for storage and transport of ammonia without special safety measures.

14 Claims, 5 Drawing Sheets

U.S. PATENT DOCUMENTS

| | | | |
|---|---|---|---|
| 5,882,381 A * | 3/1999 | Hauck et al. | 95/109 |
| 5,929,282 A * | 7/1999 | Sendelsky et al. | 564/423 |
| 6,301,879 B1 | 10/2001 | Weisweiler et al. | |
| 6,387,336 B2 * | 5/2002 | Marko et al. | 423/212 |
| 6,477,856 B1 * | 11/2002 | Khalili et al. | 62/480 |
| 6,824,914 B2 * | 11/2004 | Iyer | 429/46 |
| 6,871,491 B2 | 3/2005 | Breuer et al. | |
| 7,094,384 B1 * | 8/2006 | Brandenburg | 423/359 |
| 7,157,166 B2 * | 1/2007 | Vajo | 429/17 |
| 7,485,211 B2 * | 2/2009 | Botte et al. | 204/293 |
| 2001/0053342 A1 * | 12/2001 | Marko et al. | 423/235 |
| 2002/0028171 A1 * | 3/2002 | Goetsch et al. | 423/237 |
| 2003/0059655 A1 * | 3/2003 | Iyer | 429/17 |
| 2003/0232224 A1 * | 12/2003 | Kordesch et al. | 429/17 |
| 2004/0112056 A1 * | 6/2004 | Olander | 60/643 |
| 2004/0229101 A1 * | 11/2004 | Davis | 429/34 |
| 2004/0253492 A1 * | 12/2004 | Vajo | 429/19 |
| 2005/0037244 A1 * | 2/2005 | Goetsch et al. | 429/17 |
| 2008/0286165 A1 * | 11/2008 | Graupner et al. | 422/148 |
| 2009/0313976 A1 * | 12/2009 | Johannessen et al. | 60/295 |

FOREIGN PATENT DOCUMENTS

| | | |
|---|---|---|
| DE | 103 13 998 | 10/2004 |
| EP | 0 646 635 | 4/1995 |
| GB | 1 066 698 | 4/1967 |
| WO | WO 90/10491 | 9/1990 |
| WO | WO 98/14400 | 4/1998 |
| WO | WO 99/01205 | 1/1999 |
| WO | WO 01/87770 | 11/2001 |
| WO | WO 2005/091418 | 9/2005 |
| WO | WO 2006/012903 | 2/2006 |

OTHER PUBLICATIONS

International Search Report dated Oct. 13, 2006 for Application No. PCT/DK2006/000059.

International Preliminary Report on Patentability dated Apr. 5, 2007 for Application No. PCT/DK2006/000059.

Written Opinion dated Aug. 3, 2007 for Application No. PCT/DK2006/000059.

International Search Report dated Oct. 12, 2005 for Application No. DK200500166.

Claus Hviid Christensen, Rasmus Zink Sorensen, Tue Johannessen, Ulrich J. Quaade, Karolina Honkala, Tobias D. Elmoe, Rikke Kohler, Jens K. Norskov, "Metal Ammine Complexes for Hydrogen Storage", J. Mater. Chem., 2005, 15, 4106-4108.

* cited by examiner

HIGH DENSITY STORAGE OF AMMONIA

This application is a divisional of U.S. patent application Ser. No. 11/815,146, Johannessen et al, filed Jul. 31, 2007, titled High Density Storage of Ammonia.

BACKGROUND OF THE INVENTION

The present invention relates to safe and compact storage for storing ammonia a method for producing a compact storage for storing ammonia, systems comprising a compact storage for delivery of ammonia to ammonia consuming units and use

1. Field of the Invention

The present invention relates generally to the use of using solids for reversible storage of ammonia in solid form. In the solid form, ammonia can be transported safely, efficiently and can be released by thermal desorption and used in various applications such as fuel cells and in controlled delivery in selective catalytic reduction of $NO_x$ using ammonia as reducing agent.

Transporting ammonia as a pressurized liquid is hazardous if the container bursts caused by an accident or if a valve or tube breaks. In the case of using a solid storage medium, the safety issues are much less critical since a small amount of heat is required to release the ammonia and the equilibrium pressure at room temperature can be—if a proper solid material is chosen—well below 1 bar.

The invention relates to the storing ammonia in solids for the purpose of ammonia storage, transport and delivery to stationary and mobile applications such as catalytic removal of $NO_x$ (selective catalytic reduction using ammonia).

The present invention is especially suitable as a source for providing ammonia in selective catalytic reduction in exhaust gasses for reduction of emission from stationary and mobile combustion engines or power plants fuelled by methanol, ethanol, hydrogen, methane, ethane or any other synthetic fuel. Mobile combustion engines for which the invention is suitable are may e.g. be automobiles, trucks, trains, ships or any other motorised vehicle. The invention is particularly suitable for use in connection with reduction of $NO_x$ in combustion gases from automobiles and trucks.

Stationary power plants for which the invention is suitable are preferably power plants generating electricity.

Furthermore, the solid ammonia storage material can be used as energy carrier applied in the field of fuel cell technology. Ammonia can be catalytically decomposed into $N_2$ and $H_2$ for the use in PEM fuel cells and alkaline fuel cells or directly as ammonia in SOFC's (Solis Oxide Fuel Cells) and alkaline fuel cells. With a high ammonia storage density, the energy required to desorb and decompose ammonia still makes it a well-suited candidate for indirect hydrogen storage.

The critical part of preparing a useful solid ammonia storage medium is to obtain sufficiently high ammonia content—in particular with respect to the amount of ammonia per unit volume of the storage medium. This can be related to the demands from DOE (US Department of Energy) for hydrogen storage. Efficient ammonia storage can just as well be considered as an efficient hydrogen storage material due to the high hydrogen content in $NH_3$.

2. Description of the Related Art

In published international application No. WO 90/10491 is disclosed control of volumetric expansion of e.g. ammonia complexes of salts during adsorption and desorption in order to maintain heat transfer and reaction rates. This is obtained by compression by means of an outer barrier limiting the volumetric expansion during chemisorption.

Published US patent application No. US 2001/0053342 discloses a method for selective NOx reduction in oxygen-containing exhaust gases using ammonia and a reduction catalyst according to which gaseous ammonia is made available by heating a solid storage medium in a container.

US 2001/0053342 is silent with respect to compacting of the solid storage medium.

SUMMARY OF THE INVENTION

In a first aspect the invention relates to a solid ammonia storage and delivery material comprising an ammonia absorbing/desorbing solid material, said storage and delivery material having been compacted to a density above 50% of the theoretic skeleton density.

In a second aspect the invention relates to a method for storing ammonia in a solid material comprising steps of:
a) providing and binding ammonia in a solid material capable of binding ammonia; and
b) compacting the ammonia-containing material into a dense, solid material having a density above 50% of the theoretic skeleton density.

In a third aspect the invention relates to a system for delivery of ammonia to an ammonia consuming unit wherein the system comprises a discharge chamber for delivery of ammonia, said chamber comprising an ammonia absorbing/desorbing solid material, said material having been compacted to a density above 50% of the theoretic skeleton density, means for heating the storage, and means for conveying the delivered ammonia from the storage chamber to one or more ammonia consuming units.

BRIEF DESCRIPTION OF THE DRAWINGS

The invention is disclosed more in detail with reference to the drawings in which FIG. 1 schematically shows a device for compression of an ammonia delivery material, FIG. 2 schematically shows an embodiment of an ammonia delivery device of the invention, FIG. 3 schematically shows another embodiment of an ammonia delivery device of the invention, FIG. 4 schematically shows a system according to the invention for delivery of ammonia to fuel cells, FIG. 5 schematically shows another system according to the invention for delivery of hydrogen to fuel cells, FIG. 6 schematically shows a further embodiment of an ammonia delivery device of the invention.

DETAILED DESCRIPTION OF THE PRESENT INVENTION

The present invention relates to the compaction of a solid storage material containing absorbed or chemically coordinated ammonia. In particular, the present invention relates to the use of metal-ammine salts as solid storage media for ammonia. Ammonia can form an ammine salt by exposing an anhydrous metal salt, e.g. $CaCl_2$, $SrCl_2$ or $MgCl_2$, to gaseous ammonia in a saturation unit. During the formation of the multi-coordinated metal ammine, e.g. $Mg(NH_3)_6Cl_2$, the lattice of the salt crystal grains expands significantly and the initial grains of the salt partly disintegrates and forms a brittle structure of fine powder, which can be difficult to handle. Consequently, there is a significant porosity of the material, which reduces the volumetric ammonia capacity by a factor of approximately 2-4. I the case of magnesium chloride, the hexa-coordinated ammine salt ($Mg(NH_3)_6Cl_2$) has a skeleton density of 1.25 g/cm$^3$. The mass fraction of ammonia in saturated metal ammine salts is generally high. In the case of $Mg(NH_3)_6Cl_2$, 51.7% of the total mass is ammonia. Using the skeleton density, the maximal (theoretical) ammonia capacity is approximately 0.65 g $NH_3$/cm$^3$. However, the as-prepared $Mg(NH_3)_6Cl_2$ has a density of roughly 0.2-0.3 g/cm$^3$ due to a large internal porosity and thus a volumetric ammonia density of roughly 0.1 to 0.15 g $NH_3$/cm$^3$.

The present invention relates to a solid ammonia storage and delivery material comprising an ammonia absorbing/desorbing solid material, said storage and delivery material having been compacted to a density above 50% of the theoretic skeleton density.

When a metal ammine complex of a salt is compressed to such a high extent—i.e. to a tablet or a block with essentially no void—desorption from such a compacted material would be expected to be extremely slow, mostly due to diffusion hindrance. In most such materials desorption of ammonia would involve solid phase diffusion which is known to be a slow process for virtually all materials. This has surprisingly been found not to be the case for the dense materials according to the present invention. It has been found that when ammonia desorbs, a progressing nano-porous structure is formed as the "reaction front" proceeds, leaving open paths for additional ammonia to leave the central parts of the body of storage material. This is in contrast to e.g. classical heterogeneous catalysis where conversion of reactants is only possible, if reactants are able to diffuse into the catalyst pore structure and the products are able to diffuse out of the catalyst pore structure.

According to the invention it has now been found that it is possible to obtain a solid ammonia storage material which is easy to produce and handle and has a very high density of stored ammonia which is readily released under controlled conditions even though the porosity of the material is very low, and which storage material is safe for storage and transport of ammonia without special safety measures. By increasing the effective density—close to the skeleton density—the storage method becomes a commercially competitive technology.

In a preferred embodiment the storage and delivery material has been compacted to a density above 70% of the theoretic skeleton density, more preferred to a density above 75% such as above 80% and most preferred above 85% of the theoretic skeleton density.

The expression "skeleton density" is used in the present context to define the density of an "ideal" single crystal with no internal void, which density is determined by the distance between the ions (lattice constants) in the material and the masses of the involved atoms (the skeleton density is the density of the solid material without any internal porosity). In a poly-crystalline material, i.e. a powder, the real bulk density is easily 4-8 times lower due to the large void between the individual crystal grains. It has been found that it is possible to compact the ammonia-saturated material to a very high density—very close to the upper theoretical limit, which is set by the theoretical crystal skeleton density.

According to the present invention, ammonia is absorbed in a solid ammonia storage and delivery material which is then compacted under a high pressure of several tons/cm$^2$ to reach nearly the theoretical density, whereafter desorption takes place essentially without counter pressure.

In a preferred embodiment of the invention the storage and delivery material comprises ammonia adsorbed or chemically bonded or coordinated as a chemical complex in the form of a solid material that has been compressed into a block or tablet or a pellet of a desired shape.

Forming complexes and compacting according to the invention provides solids having a high volumetric density as opposed to "simple" absorption resulting in solids that are rather porous and, consequently, the volumetric ammonia density (moles $NH_3$/m$^3$ or kg $NH_3$/m$^3$) can as low as 10-50% of the theoretical value due to the internal porosity in the saturated material.

The term "tablets" is used in the present context to designate smaller tablets, monoliths or larger blocks or solid bodies of any convenient shape such as a ring.

In accordance with the invention it is preferred that the solid material is a salt that binds ammonia in the form of a chemical complex as such salts have proven special advantages as will explained below.

In a preferred embodiment of the invention the solid material is an ionic salt of the general formula:

wherein M is one or more cations selected from alkali metals such as Li, Na, K or Cs, alkaline earth metals such as Mg, Ca or Sr, aluminium and transition metals such as V, Cr, Mn, Fe, Co, Ni, Cu or Zn or combinations thereof such as NaAl, KAl, $K_2Zn$, CsCu or $K_2Fe$, X is one or more anions selected from fluoride, chloride, bromide, iodide, nitrate, thiocyanate, sulphate, molybdate and phosphate ions, a is the number of cations per salt molecule, z is the number of anions per salt molecule, and n is the coordination number of 2 to 12.

It is especially preferred that the solid material comprises at least one salt in the form of at least one chloride or sulphide of at least one alkaline earth metal as these compounds are relatively cheap and readily absorbs and desorbs ammonia under controlled conditions. These materials also have relatively low molecular masses and the resulting ammonia density calculated as a mass fraction will be higher.

Especially preferred the solid materials are $MgCl_2$, $CaCl_2$ and $SrCl_2$ and mixtures thereof, especially $MgCl_2$ due to the especially advantageous properties.

In accordance with a further embodiment of the invention the solid material is mixed with a binder in order to enhance the mechanical stability of the compacted solid or to facilitate the compaction procedure itself. Suitable binders are inert fibres that do not adversely affect the absorption/desorption of ammonia, e.g. fibres from $SiO_2$, which will provide cohesion to the structure on larger length scales than just the individual crystal grains of the compacted material.

As opposed to a "fluffy" powder, the compacted material can easily be handled during transport and during and after the final application.

It has surprisingly been found that a powdered ammonia delivery material of the present invention has a very low vapour pressure of ammonia at room temperature may be compacted to a very high density using several different methods for shaping of the material into a desired form and still be capable of delivery of ammonia at a sufficient rate to be suitable for use as a source of ammonia for a SCR reduction of NOx in e.g. automotive vehicles, boilers and furnaces. Such methods are e.g. pressing, extrusion, and injection moulding. In the case of pressing, a pressure might be applied in several different ways in a manner known per se. In one embodiment, the material is compressed to shapes like dense blocks or tablets by placing the saturated salt in a groove/dent/hole/pit in a metal block (e.g. in a cylindrical hole) and applying pressure to compress the material using a piston.

The metal-ammine salts constitute a solid storage medium for ammonia, which represent a safe, practical and compact option for storage and transportation of ammonia. As an example, a single-crystalline compound of $Mg(NH_3)_6Cl_2$ has an ammonia density of 38 kmole $NH_3/m^3$, whereas that of liquid ammonia is only slightly higher (40 kmole $NH_3/m^3$). Ammonia may be released from the metal ammine salt by heating the salt to temperatures in the range from 10° C. to the melting point of the metal salt ammine complex, preferably to a temperature from 30 to 700° C., more preferred to a temperature from 100 to 500° C.

During release of ammonia the metal-ammine salt of the formula $M_a(NH_3)_nX_z$ wherein M, X, a, n, and z has the meaning stated above, is gradually transformed into a salt of the formula $M_a(NH_3)_nX_z$ wherein $0 \leq m < n$. When the desired amount of ammonia has been released, the resulting salt of formula $M_a(NH_3)_mX_z$ can usually be converted back into the salt of the formula $M_a(NH_3)_nX_z$ by treatment with a gas containing ammonia.

As an example, anhydrous $MgCl_2$ absorbs up to six moles of NH3 (Gmelins Handbuch, 1939; Liu, 2004) according to reactions 1 to 3:

$$MgCl_2(s)+NH_3(g) \leftrightarrow Mg(NH_3)Cl_2(s) \quad (1)$$

$$Mg(NH_3)Cl_2(s)+NH_3(g) \leftrightarrow Mg(NH_3)_2Cl_2(s) \quad (2)$$

$$Mg(NH_3)_2Cl_2(s)+4NH_3(g) \leftrightarrow Mg(NH_3)_6Cl_2(s) \quad (3)$$

Typical ammonia contents of the metal ammine complexes are in the range of 20-60 wt %, and preferred complexes comprise above 30 wt % ammonia, more preferred above 40 wt % ammonia. The inexpensive compound $Mg(NH_3)_6Cl_2$ contains 51.7 wt % ammonia. A similar inexpensive compound based on CaCl2, i.e. $Ca(NH3)_8Cl_2$ contains 55% by weight ammonia.

The present invention offers ammonia storage at significantly higher densities (both on a volume and a weight basis) than both aqueous ammonia and aqueous urea. For several metal ammine salts it is possible to release all ammonia and then transform the resulting material back into the original metal ammine salt in a large number of cycles. Additionally, the ammonia is directly delivered into the exhaust pipe as a gas, which is an advantage in itself—both for the simplicity of the flow control system and for an efficient mixing of reducing agent, ammonia, in the exhaust gas—but it also eliminates possible difficulties related to blocking of the dosing system because of precipitation in the liquid-based system.

For many applications wherein ammonia-related safety is essential, the compacted $Mg(NH_3)_6Cl_2$ complex offers a further advantage in that the vapour pressure of ammonia above a solid salt phase is below 0.1 bar at room temperature, preferably below 0.01 bar and even as low as 0.002 bar at room temperature and atmospheric pressure. In practice, this eliminates any noxious effect of the ammonia as the release of ammonia is as low as or lower than the release from common cleaning materials containing ammonia.

For $Mg(NH_3)_6Cl_2$ the partial pressure of ammonia at room temperature is 0.002 bar. Even though a partial pressure of ammonia of 0.002 bar at ambient temperature in itself could cause health problems, the compacted material according to the invention saturated with ammonia releases ammonia at a very slow rate at ambient temperature and an equilibrium pressure of 0.002 bar will only be obtained after a considerable span of time, even if the material is placed in a very confined space. However, when raising the temperature e.g. in the delivery device, a quite quick desorption of ammonia is observed as discussed above.

For mobile units, it is particularly useful to use an ammonia delivery device comprising a container containing the metal ammine complex as such a container may easily be separated from mobile unit and replaced by a fresh at suitable intervals. In preferred embodiments, the metal ammine containers are recycled and recharged with ammonia in a separate recharging unit. In other preferred embodiments the material is re-saturated with ammonia in situ or on-board by connecting a source of ammonia (e.g. a large tank containing liquid ammonia) to the storage container and thus exposing the ammonia-depleted salt in the container to gaseous or liquid ammonia.

Due to the slow release of ammonia in open atmosphere at ambient temperatures for the compressed materials of the present invention, the handling of the materials does not necessarily require extensive safety precautions. Therefore, substitution of exhausted storage and delivery material with fresh material does not necessarily require an encapsulation of the material facilitating the handling as compared to the handling of the materials used in the methods of the state of the art.

In a second aspect the invention relates to a method for storing ammonia in a solid material comprising steps of:
a) providing and binding ammonia in a solid material capable of binding ammonia; and
b) compacting the ammonia-containing material into a dense, solid material having a density above 50% of the theoretic skeleton density.

In accordance with the invention it is possible to form the dense solid material into a desired shape during compaction or in a subsequent processing step.

In a preferred embodiment the present invention is related to the compaction and shaping of the saturated ammonia storage and delivery material.

Prior to compaction, the solid material suitably consists of a granular material, a porous material, a crystalline material, an amorphous material or a combination thereof.

The saturated solid, e.g. $Mg(NH_3)_6Cl_2$ can be compacted significantly by several different methods, which also includes shaping of the material into a desired form. Such methods include: pressing, extrusion and injection moulding. In the case of pressing, a pressure might be applied in several different ways. In one embodiment, the material is compressed to shapes like dense blocks or tablets by placing the saturated salt in a groove/dent/hole/pit in a metal block (e.g. in a cylindrical hole) and applying pressure to compress the material using a piston pressed against the initially porous or powdery solid.

In a preferred embodiment of the invention the solid material is compacted and shaped in a mould using mechanical pressure.

Compacting and shaping of the solid material may suitably be carried out in a manner known per se such as injection moulding, extrusion or monolith preparation.

The compacted solid ammonia storage material can be prepared e.g. in the form of cylinders, rods, cubes, rectangular shaped blocks or other shapes having overall dimensions suitable to the desired ammonia consumption in the ammonia consuming unit. For some applications requiring only a small amount of ammonia, the weight of the compacted storage unit may be below 10 g. In other applications requiring large amounts of ammonia, the rods/blocks/cylinders (or other shapes) may even be above 100 kg in size. The corresponding volume of the units may also vary from below 1 cm³ to above 1000 litres. Examples of different sizes and shapes (but mot limited to those) are:

1. tablets with a diameter of 13 millimetres and a height of 10 millimetres,
2. ring-shaped units having dimensions of the magnitude of centimetres such as an outer diameter of 52 millimetres, a hole of a diameter of 27 millimetres and a height of 13 millimetres, or
3. cubes having a length of about 10 centimetres and preferably having rounded edges.

The more regular shapes bodies are preferred when several pieces of compacted materials are to be placed in a common container as the space may then be utilized more efficiently than e.g. packing of spheres.

In one embodiment of the method of the invention the solid material binds ammonia by absorption, and ammonia is preferably bound in solid material in the form of a chemical complex.

It is preferred to saturate the solid material completely with ammonia to reach its maximum capacity. On the other hand it may be acceptable for economical reasons not to saturate the material completely in cases where a full saturation of larger units requires a very long saturation time.

In one embodiment the invention relates to a method of producing a solid ammonia storage and delivery material comprising an ammonia absorbing salt, wherein the ammonia absorbing salt is an ionic salt of the general formula:

$$M_a(NH_3)_nX_z,$$

wherein M is one or more cations selected from alkali metals such as Li, Na, K or Cs, alkaline earth metals such as Mg, Ca or Sr, Al and transition metals such as V, Cr, Mn, Fe, Co, Ni, Cu or Zn or combinations thereof such as NaAl, KAl, K₂Zn, CsCu or K₂Fe, X is one or more anions selected from fluoride, chloride, bromide, iodide, nitrate, thiocyanate, sulphate, molybdate and phosphate ions, a is the number of cations per salt molecule, z is the number of anions per salt molecule, and n is the coordination number of 2 to 12, said method comprising the steps of
1) providing the solid salt,
2) saturating the salt with ammonia, and
3) compressing the ammonia salt complex.

The expression "saturated" is used in the present context to define a state in which the material cannot take up more ammonia according to the absorption reactions or the capacity of the solid in general. As an example, for $MgCl_2$, the material is fully saturated when six $NH_3$ molecules are coordinated around each $MgCl_2$-unit, i.e. $Mg(NH_3)_6Cl_2$. $CaCl_2$ can take up 8 molecules of ammonia per unit $CaCl_2$.

A powdery ammonia saturated material may be prepared by exposing the dry salt to gaseous ammonia in a manner known per se.

The ammonia saturated delivery material as prepared is powdery and rather "fluffy" and difficult to handle or transport and may be—during transport or use—transformed into small particle fragments thereby potentially blocking the dosing system of a device or give rise to hazardous dust into the environment. Furthermore, the powder has a low bulk density.

In a preferred embodiment of the method of the invention, the ammonia salt complex is compressed to a density of 1.0 to 1.3 g/cm³, more preferred to a density of 1.1 to 1.3 g/cm³

In a preferred embodiment of the invention the solid material comprises at least one salt in the form of at least one chloride or sulphide of at least one alkaline earth metal. Such materials have proven very suitable for the purpose of the present invention, are readily available and are relatively safe to use. The solid material is preferably $MgCl_2$, $CaCl_2$ or $SrCl_2$ or mixtures thereof.

In a further embodiment of the invention the method further comprises the step of mixing the solid material with a binder before compacting the solid material in order to enhance the mechanical stability of the compacted solid or to facilitate the compaction procedure itself and to provide cohesion to the structure.

In one embodiment of the invention the method further comprises the steps of c) placing the compacted ammonia-containing material in a closed chamber provided with means for conveying ammonia from the chamber to one or more ammonia consuming units, and d) heating the chamber for releasing ammonia.

It is preferred that the ammonia is conveyed by normal pressure-driven flow through connection tubes to the ammonia-consuming units and wherein the pressure is controlled directly by heating the chamber containing the compact ammonia storage material.

In a further embodiment of the invention, the method further comprises the step e) providing and binding ammonia in the solid material depleted of ammonia for reusing the solid material.

Thus, in one embodiment a method of the invention comprises the steps of i) providing a container with compacted ammonia storage material ii) releasing the ammonia form the storage container to an ammonia consuming unit by heating the container, and iii) re-saturating the storage container with ammonia by re-absorbing ammonia into the material by providing gaseous or liquid ammonia through a connection to the storage container.

It is preferred to carry out the re-saturation with ammonia by providing liquid ammonia to the storage material or storage container, after it has been depleted for ammonia. Using liquid ammonia accelerates the re-saturation because the endothermic evaporation of liquid ammonia takes up part of the heat evolved when ammonia is absorbed in the depleted material. Furthermore, the necessary capacity of heat exchange for carrying out fast re-saturation in larger units is minimised when heat evolvement from the re-saturation process is utilized for evaporation of the liquid ammonia. This renders it possible to re-saturate in situ.

In a third aspect the invention relates to a system for delivery of ammonia to an ammonia consuming unit wherein the system comprises a discharge chamber for delivery of ammonia, said chamber comprising an ammonia absorbing/desorbing solid material, means for heating the storage material, and means for conveying the delivered ammonia from the storage chamber to one or more ammonia consuming units.

The ammonia consuming unit may suitably be a system wherein ammonia is used for catalytic removal of $NO_x$, In a further embodiment the ammonia consuming unit is an internal combustion engine fuelled by ammonia, a fuel cell capable of using ammonia as a fuel. Still further, the ammonia consuming unit may a catalytic reactor decomposing the ammonia into hydrogen and nitrogen, and such unit suitably comprises means for conveying the hydrogen to one or more fuel cells using hydrogen as fuel.

In one embodiment of the system of the invention the system comprises a feeding system for continuous feeding of solid ammonia storage and delivery material into the discharge chamber wherein ammonia is released by thermal desorption.

In a still further embodiment of the invention the system further comprises:

a feeding system comprising a number of compartments where each compartment comprises one or more unit(s) of solid ammonia storage and delivery material, which feeding system is adapted to introducing the units sequentially into the discharge chamber wherein ammonia is released by thermal desorption.

In another embodiment of the invention the system comprises a feeding system in which the total amount of ammonia storage material is divided into minor parts or sections being heated separately, thus avoiding the need of heating the entire mass of storage material simultaneously in order to release ammonia and to introduce new units of ammonia storage material when the ammonia content of one unit is discharged.

The system preferably further comprised means for supplying ammonia to the storage chamber for re-saturate the material in situ.

A system of the invention typically comprises a container comprising an ammonia absorbing salt, said container being provided with one or more closable outlet opening(s) connected to a pipe and further being provided with means for heating the container and the ammonia absorbing salt for release of gaseous ammonia as a source for ammonia.

The closable outlet opening(s) may be in the form of one or more valve(s).

Heating means may be in the form of an electrical resistive heating device.

The heating means may alternatively be provided as heat produced by chemical reactions or as heat from hot exhaust gas from a combustion process.

A metal ammine salt complex for delivery of ammonia is normally heated to temperatures in the range from 10° C. to the melting point of the metal salt ammine complex, preferably to a temperature from 30 to 700° C., more preferred to a temperature from 100 to 500° C.

In a preferred embodiment of the invention the release rate of ammonia is controlled by accurate control of the heating of the container and the ammonia absorbing salt for release of gaseous ammonia. The release of ammonia is preferably further controlled by reduction valves, flow controllers or similar equipment or units. The release may be further controlled by introducing a buffer volume between the storage container and the ammonia consuming unit in order to be able to compensate for a rapidly fluctuating dosing of ammonia to the ammonia consuming unit. The release of ammonia from a container is preferably controlled by interaction with an electronic engine control system for delivery of an optimum amount of ammonia in a specific ratio (e.g. $NH_3:NO_x=1:1$) of the changing emission of NOx from an engine.

In a further aspect the invention relates to a device for providing ammonia for a selective catalytic reduction of $NO_x$ in an oxygen-containing exhaust gas of a combustion engine or combustion process by using gaseous ammonia and a reduction catalyst, the device comprising:

a container for containing a compacted solid storage material;
means for heating the container;
means for introducing gaseous ammonia from the container into an exhaust line before the reduction catalyst;
means for controlling the amount of ammonia introduced into the exhaust line, depending on the operating conditions of the engine.

In a still further aspect the invention relates to a method of producing a solid ammonia storage and delivery material comprising an ammonia absorbing salt, said method comprising the steps of 1) providing the solid salt,
2) saturating the salt with ammonia, and
3) compressing the ammonia salt complex to a density above 50% of the theoretic skeleton density.

The compacted ammonia storage solid is particularly useful for application such as:

Releasing ammonia into a solid oxide fuel cell for generation of electrical energy Releasing ammonia into a catalytic decomposition unit ($2NH_3 \rightarrow 3H_2+N_2$) with an optional absorption of remaining $NH_3$ and feeding the generated hydrogen into a hydrogen based fuel cell, e.g. a PEM fuel cell, an alkaline fuel cell, a phosphoric acid fuel cell or a molten carbonate fuel cell.

A controlled release of ammonia—in some cases directly following a dynamic $NO_x$ transient—in order to use ammonia as a reducing agent in selective catalytic removal of $NO_x$ in exhaust gasses from combustion engines.

In preferred embodiments the invention relates to
1) A power generating device comprising:
a container for containing a compacted solid storage material;
means for heating the container;
an electrochemical cell for converting ammonia into electrical power;
means for introducing gaseous ammonia into the electrochemical cell, and
2) A power generating device comprising:
a container for containing a compacted solid storage material;
means for heating the container;
a decomposing catalyst for decomposing the desorbed ammonia into hydrogen and nitrogen;
means for introducing ammonia into the decomposing catalyst;
an electrochemical cell for converting hydrogen into electrical power;
means for introducing gaseous hydrogen into the electrochemical cell.

In a still further aspect the invention relates to the use of a solid ammonia storage and delivery material comprising an ammonia absorbing/desorbing solid material, said storage and delivery material having been compacted to a density above 50% of the theoretic skeleton density as a source of ammonia in one or more ammonia consuming units.

In an embodiment the invention relates to the use of a solid ammonia storage and delivery material comprising an ammonia absorbing/desorbing solid material, said storage and delivery material having been compacted to a density above 50% of the theoretic skeleton density as a source of ammonia as the reducing agent in selective catalytic reduction (SCR) of $NO_x$ in exhaust gases from combustion processes.

In a preferred embodiment of the invention the solid material is an ionic salt of the general formula:

$$M_a(NH_3)_nX_z,$$

wherein M is one or more cations selected from alkali metals such as Li, Na, K or Cs, alkaline earth metals such as Mg, Ca or Sr, Al and transition metals such as V, Cr, Mn, Fe, Co, Ni, Cu or Zn or combinations thereof such as NaAl, KAl, $K_2Zn$, CsCu or $K_2Fe$, X is one or more anions selected from fluoride, chloride, bromide, iodide, nitrate, thiocyanate, sulphate, molybdate and phosphate ions, a is the number of cations per salt molecule, z is the number of anions per salt molecule, and n is the coordination number of 2 to 12. In a preferred embodiment for SCR M is Mg.

In a preferred embodiment of the invention an ammonia delivery device comprising a container comprising an ammonia absorbing salt, wherein the ammonia absorbing salt is an ionic salt of the general formula:

wherein M is one or more cations selected from alkali metals such as Li, Na, K or Cs, alkaline earth metals such as Mg, Ca or Sr, aluminium and transition metals such as V, Cr, Mn, Fe, Co, Ni, Cu or Zn or combinations thereof such as NaAl, KAl, $K_2Zn$, CsCu or $K_2Fe$, X is one or more anions selected from fluoride, chloride, bromide, iodide, nitrate, thiocyanate, sulphate, molybdate and phosphate ions, a is the number of cations per salt molecule, z is the number of anions per salt molecule, and n is the coordination number of 2 to 12, said container being provided with one or more closable outlet opening(s) connected to a pipe and further being provided with means for heating the container and the ammonia absorbing salt for release of gaseous ammonia is used as a source for ammonia in selective catalytic reduction of $NO_x$ in exhaust gases from combustion processes.

In a preferred embodiment the invention relates to the use of a solid ammonia storage and delivery material comprising a complex ammonia absorbing/desorbing solid material, said storage and delivery material having been compacted to a density above 50% of the theoretic skeleton density in connection with a PEM fuel cell, wherein the ammonia storage material has an ammonia pressure in the range of 0.1-15 bar between room temperature and the operating temperature of a fuel cell. In one embodiment the complex solid ammonia storage and delivery material is $CaCl_2$, $SrCl_2$ or a mixture thereof. Such solid ammonia storage and delivery material has a suitable supply-pressure of ammonia at temperatures obtainable when using waste heat from a conventional PEM-fuel cell or alkaline fuel cells as a source of heat which reduces or eliminates the need of an external source of heat for the desorption of ammonia.

In the explanation of the present invention the term "absorb" has been used to designate the binding of ammonia to a solid material. This is not considered as a limitation of the invention to the physical absorption to the extent that adsorption to the surface of a solid material will provide the same option of desorbing the material in a controlled manner using heat.

DESCRIPTION OF THE PREFERRED EMBODIMENTS

The invention is now explained more in detail with reference to the drawings showing preferred embodiments of the invention.

Preparation of Ammonia Saturated $MgCl_2$ Powder.

The ammonia carrier, $Mg(NH_3)_6Cl_2$, was prepared by placing a batch of $MgCl_2$ powder for several days in a glovebag containing ammonia gas at atmospheric pressure. The degree of saturation was checked by temperature programmed desorption (TPD) and verified to be near 100% of the theoretical amount. The absorption/desorption was found to be fully reversible.

The rate of absorption is dramatically increased at higher $NH_3$ pressures (minutes rather than days) (Touzain and Moundamga-Iniamy, 1994).

Figure 1:
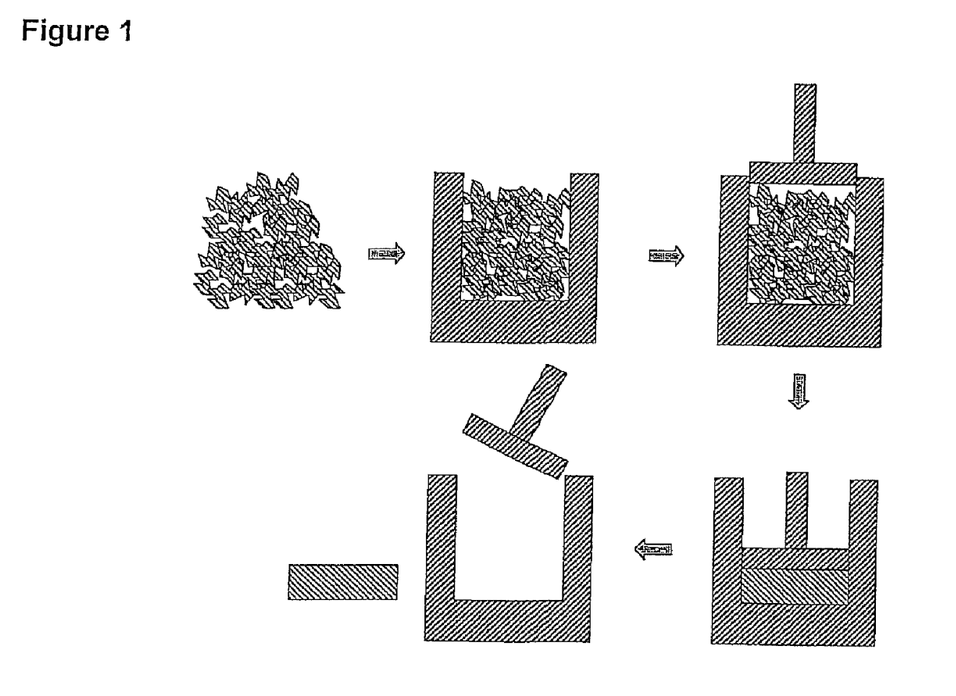

FIG. 1 schematically shows a device according to the present invention for compression of the solid ammonia storage medium. In this embodiment, the solid ammonia storage medium is compressed in a chamber by applying mechanical force to a piston acting on the porous storage medium. When the piston is removed, the storage medium is in the shape of a tablet, and has a density above 80% of the theoretical crystal density.

Example 1

Compression of Solid Ammonia Storage Medium into Tablets

FIG. 1 schematically shows a device according to one embodiment of the invention for compression of 1 gram of the solid ammonia delivery material for the preparation of cylindrical tablets (dimensions: 13 mm in diameter; 10 mm high). In this embodiment, the solid ammonia delivery material was compressed in a chamber by applying a pressure of 2-4 tons/$cm^2$ using a piston compressing the powdered saturated storage material. The chamber and the piston were made from stainless steel. When the piston was removed, the delivery material was in the desired shape of e.g. a tablet, a cylinder or a rod, and had a density above 80% of the theoretical crystal density.

The tablets have densities in the range of 1.1-1.2 g/$cm^3$, which is roughly an increase in effective density of the as-prepared powder by a factor of 4. The resulting tablet or block is compact, easy-to-handle and represents a safe ammonia storage material.

The structure of the densified storage tablet was verified by recording an XRD spectrum of the hexa-coordinated ammine salt after tablet pressing. In addition, the tablet was placed in a testing unit, which slowly degasses the ammonia by thermal desorption. The total ammonia content in terms of mass fraction was verified to be above 99% of the theoretical amount. Thus the invention provides the possibility of making an ammonia storage material with an ammonia density above 0.6 g $NH_3$/$cm^3$. For use as hydrogen storage, the hydrogen capacity is well above 6% w/w. For the compacted $Mg(NH_3)_6Cl_2$, the hydrogen density is 9.1% w/w and with the obtained solid density of the material the hydrogen density is 0.1-0.11 g $H_2$/$cm^3$. The demonstrated density of at least 0.6 grams $NH_3$/$cm^3$ is above 90% of the volumetric density of liquid ammonia stores under a pressure (8 bar) at room temperature.

Figure 2:
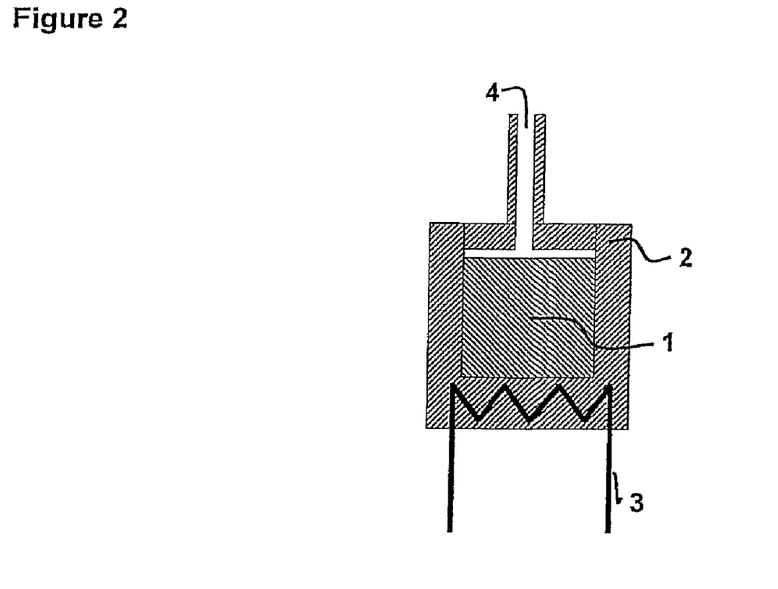

FIG. 2 schematically shows an embodiment of an ammonia delivery device of the invention for desorption of the compressed delivery material. In this embodiment, one or more tablets of solid ammonia delivery material 1 are placed in a container 2, which can be heated by a heating device 3. Desorbed ammonia leaves the container through a nozzle 4. Heat for the heating device 3 may be provided by e.g. resistive electric heating or chemical reactions. Such chemical reactions could be generated e.g. by combustion of a part of the released ammonia or hydrogen produced by reforming of the released ammonia into hydrogen and nitrogen. If the delivery device is used in connection with SCR of NOx in exhaust gases, waste heat from the engine producing the gases can also be applied. The degassing of ammonia from the compacted storage medium can be carried of in a sequential manner as follows:

1. The desired total mass of saturated ammonia material is not pressed into a single block but compressed into a number of smaller units.
2. Each unit can be fed one at the time to a degassing unit using heat (e.g. electrical or a heat exchanger) as degassing method.
3. When one storage material unit is degassed, a new unit is fed to the degassing chamber thus replacing the ammonia-depleted unit.

Such a system has a significant advantage since only a minor fraction of the total mass has to be heated in order to release the continuous need for ammonia down-stream in the process.

Figure 3:
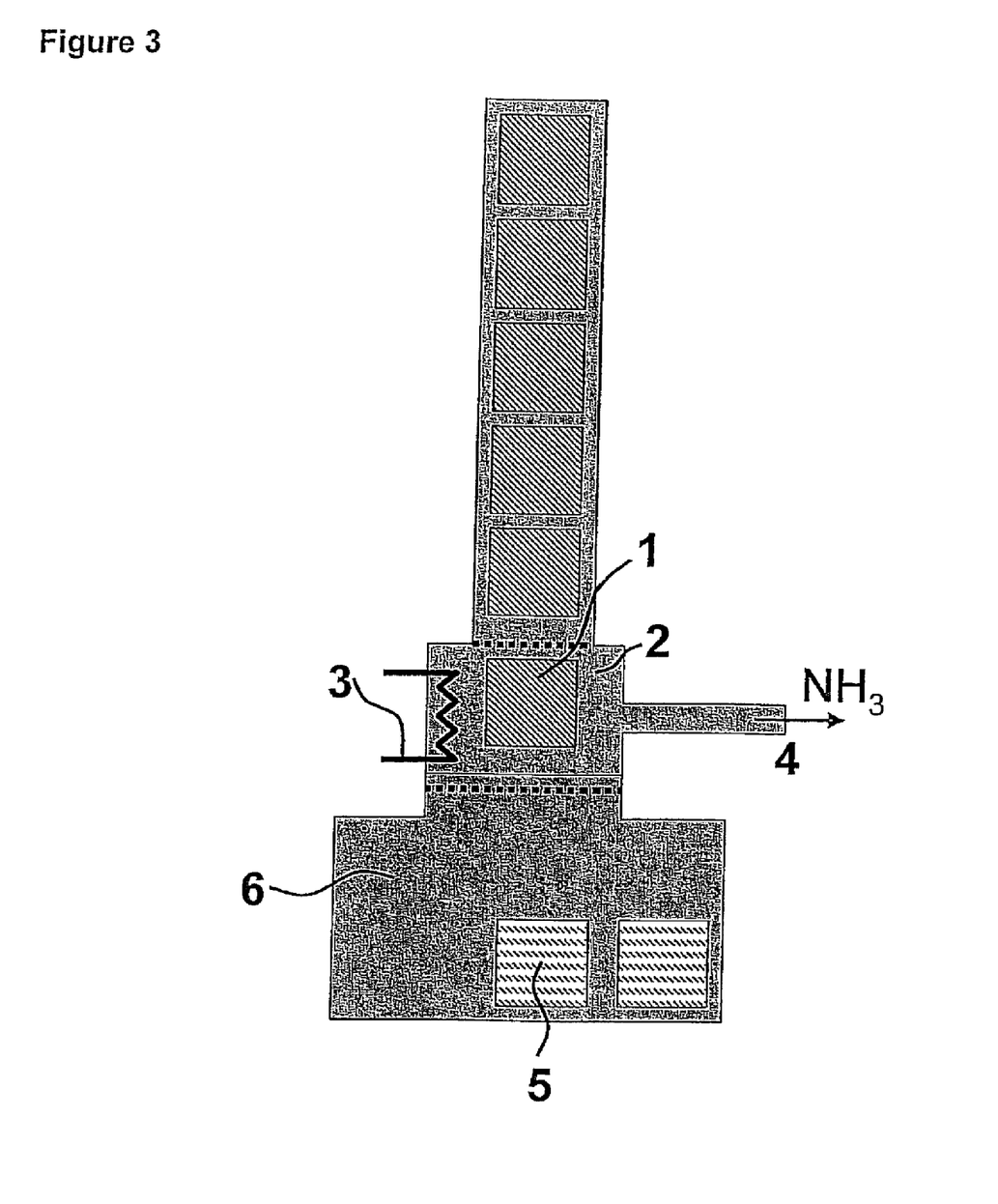

FIG. 3 schematically shows a preferred embodiment where only a part of the stored solid ammonia storage medium 1 is heated at a time. The solid storage material is stored in compressed form, and introduced into a hot chamber 2 one at the time at intervals corresponding to the requirement for gaseous ammonia. The hot chamber is heated by a heating device 3 operated after the same principles as described for FIG. 2. Gaseous ammonia leaves the hot chamber through a noble 4, and when all ammonia is desorbed from a tablet of solid ammonia storage material 5, it is discarded into a separate container 6.

In a similar type of embodiment, the entire storage material is separated into a number of compartments each having their own heating source so that it is possible to have complete desorption of a given fraction of the material without using any moving parts to replace saturated/unsaturated salt e.g. on-board the vehicle during use.

Figure 4:
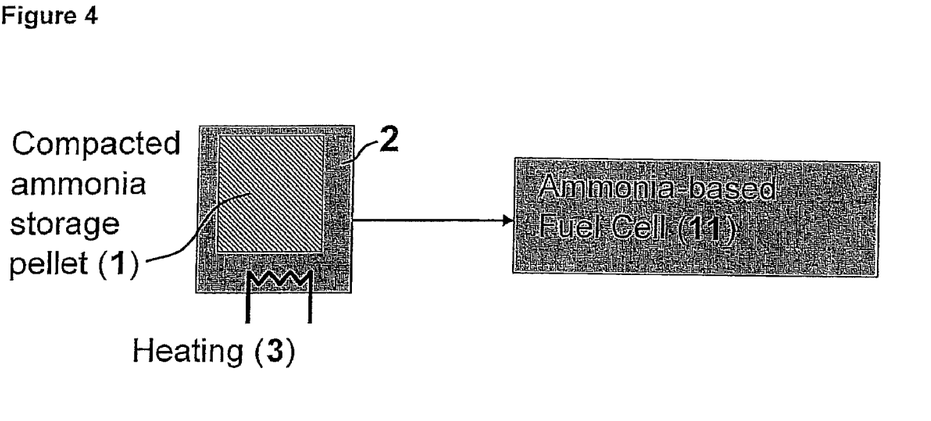

FIG. 4 describes schematically an embodiment of a system according to the invention, wherein ammonia is desorbed from the compacted solid storage medium 1 and led directly into a power generating unit in the form of an ammonia fuelled fuel cell 11. In a preferred embodiment of this system according to the present invention the power generating unit is be a fuel cell of the SOFC type or an alkaline type fuel cell.

Figure 5:
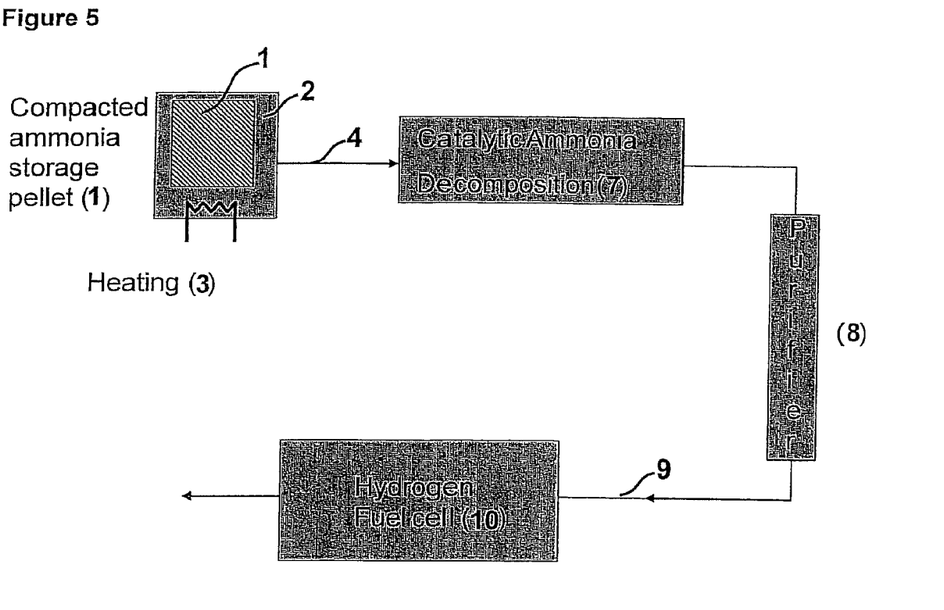

In FIG. 5 another embodiment of a system according to the present invention is described, wherein a compacted ammonia storage medium 1 is heated in a container 2 by a heating device 3. Desorption takes place in the same way as described in connection with FIGS. 2 and 3. After leaving the container 2 through the pipe 4 the ammonia enters a catalytic reactor 7 wherein it is decomposed to hydrogen and nitrogen. Any residual ammonia may be removed in an optional purification unit 8. The resulting hydrogen and nitrogen are rare then fed through pipe 9 into an electrochemical power generating device in the form of a hydrogen fuelled fuel cell 10. In a preferred embodiment the fuel cell is a fuel cell of the PEM or alkaline type.

Figure 6:
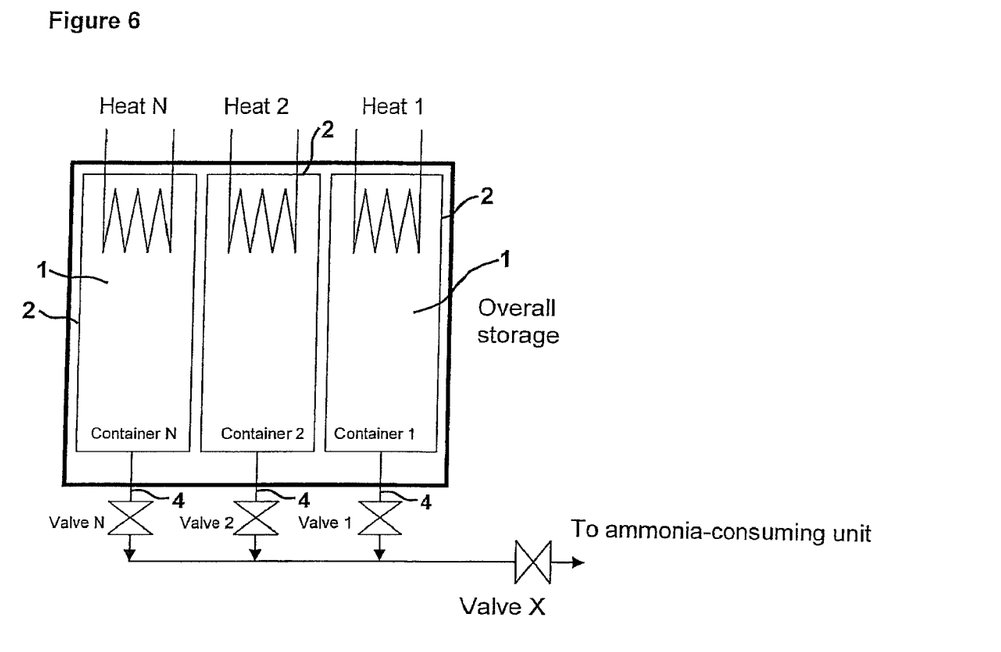

FIG. 6 schematically shows a further embodiment of an ammonia delivery device of the invention which comprises a number of individual containers (2) (Container 1, 2, . . . , N) each comprising an ammonia storage and delivery material (1) according to the invention and individual sources of heat (Heat 1, Heat 2, . . . , Heat N) for heating the individual containers sequentially and individual valves for opening the outlet (4) of the container from which ammonia is released.

Example 2

Compression of Solid Ammonia Storage Medium into Rings

In another embodiment of the invention rings or larger blocks of more complicated shapes of the storage material may be produced. In this example rings having an outer diameter of 52 millimetres and a central hole having a diameter of 27 millimetres were made using the procedure described in Example 1 using corresponding moulds made from stainless steel. 20 grams of the solid ammonia delivery material were compressed for the preparation of rings (dimensions: outer diameter of 52 millimetres, a central hole having a diameter of 27 millimetres and thickness (height) 13 millimetres). In this embodiment, the solid ammonia delivery material was compressed in a chamber by applying a pressure of 25 tons (about 157 tons/cm$^2$) using a piston compressing the powdered saturated storage material in a compression ratio of about 6.3. When the piston was removed, the delivery material was in the desired shape of a ring, and had a density above 80% of the theoretical crystal density.

Figure 7:
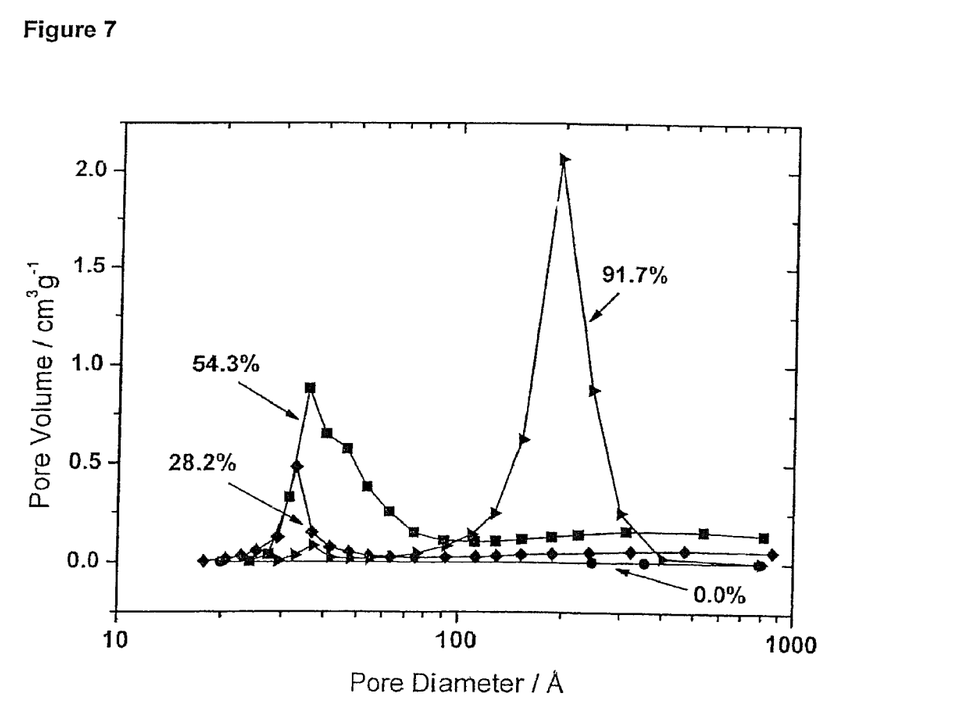
FIG. 7 is a graphical representation of the formation of pores during the desorption of ammonia from $MgCl_2$.

FIG. 7 is a graphical representation showing the formation of pores during desorption of ammonia from the compacted and saturated $Mg(NH_3)_6Cl_2$ before and after the transformation into a porous block of $MgCl_2$. The pore size distribution was measured using a Micromeritics ASAP 2010 apparatus during desorption as a function of the degree of release, and it appears that although nearly no porosity was present initially, the size of the pores increase with increasing degree of desorption facilitating the further desorption of ammonia. This enables the release of ammonia from large blocks or rods or similar shapes of the saturated ammonia storage material even though initially there is essentially no pore system in the material.

Figure 8:
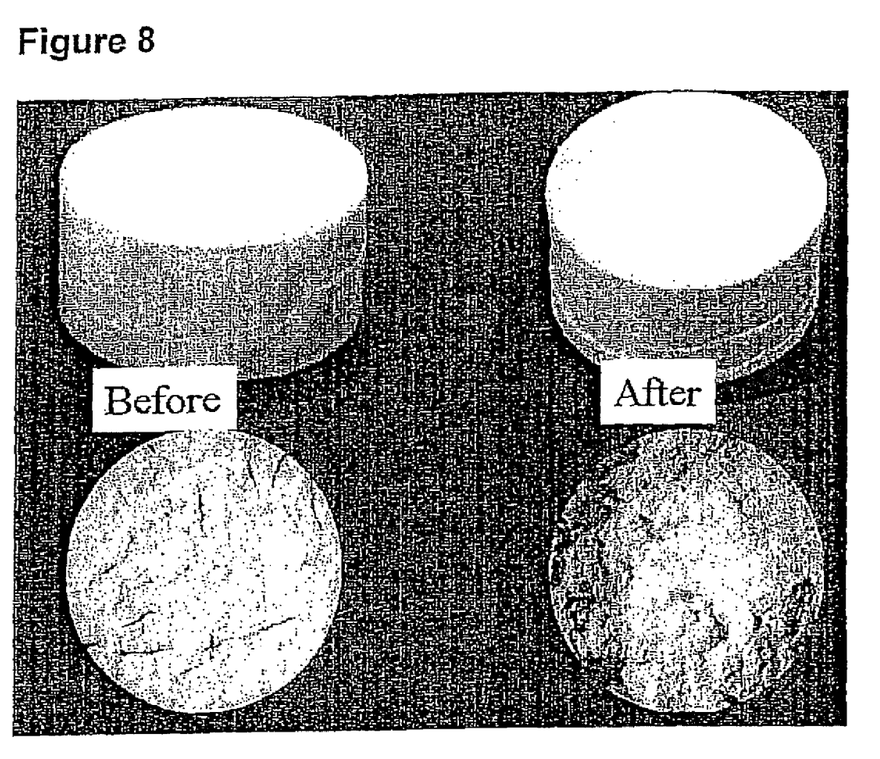
FIG. 8 shows photographs of a tablet of the invention before and after release of ammonia.

FIG. 8 shows a photograph of a tablet of $Mg(NH_3)_6Cl_2$, which is (left) fully saturated with ammonia and a fractured surface thereof. It can be seen that the overall structure of the tablet is retained after desorption (right) but the internally, the tablet has become porous in accordance with to the pore volume measurements presented in FIG. 7. In other words, the dense, saturated tablet has been transformed into a porous "sponge" of depleted salt.

In another experiment a quite low bed-density of the delivery material was obtained when $Mg(NH_3)_6Cl_2$ was compacted manually (331 kg/m$^3$ when compacted gently by hand) as compared to the density of $MgCl_2$ and $Mg(NH_3)_6Cl_2$ compacted in accordance with the invention (1252 kg/m$^3$, cf. the below table).

TABLE

| Salt | Mass density kg/m$^3$ | Molar volume cm$^3$/mole | Source |
| --- | --- | --- | --- |
| $MgCl_2$ | 2325 | 40.86 | CRC Handbook 2004 |
| $Mg(NH_3)_6Cl_2$ | 1252 | 157.4 | Gmelins Handbook 1939 |

A low density means that the entire storage system would require more space. This problem was in this example solved by compressing $Mg(NH_3)_6Cl_2$ into solid rods having a density of 1219 kg/m$^3$ (97% of the solid density) as disclosed in Example 1. TPD experiments confirmed that it was possible to desorp all ammonia from this tablet, thus increasing the potential storage capacity by a factor of 3.7 (on a molar basis) to approximately 93% of the volumetric ammonia storage capacity of liquid ammonia. A nearly quantitative desorption of ammonia from the dense material was possible because the front of desorption leaves behind a porous layer of anhydrous $MgCl_2$. This automatically generates the required pore system needed for mass-transfer through the structure. This is considered an ideal combination of a) an initially very compact structure having almost no void and being easy to handle, b) a high capacity for containing and delivering ammonia, c) a low external surface area, and d) a high degree of safety.

The invention claimed is:
1. A system for delivery of ammonia to an ammonia consuming unit wherein the system comprises a discharge chamber having a single opening, said opening being used for delivery of ammonia, said chamber comprising a compacted ammonia absorbing/desorbing solid material in the form of one or more compacted units, means for heating said chamber wherein ammonia is released by thermal desorption, and means for conveying the desorbed ammonia from said dis- charge chamber to one or more ammonia consuming units, wherein said compacted ammonia absorbing/desorbing solid material is selected from an ionic salt of the general formula $M_a(NH_3)_nX_z$ wherein M is one or more cations selected from alkali metals, alkaline earth metals, aluminum, transition metals and combinations thereof, X is one or more anions selected from fluoride, chloride, bromide, iodide, nitrate, thiocyanate, sulphate, molybdate and phosphate ions, a is the number of cations per salt molecule, z is the number of anions per salt molecule, and n is the coordination number of 2 to 12, said ionic salt being compacted to a density above 50% of the theoretical skeleton density, and wherein the volume of a compacted unit of said compacted ammonia absorbing/desorbing solid material ranges from about 1 cm³ to about 1000 liters.

2. A system according to claim 1, wherein the ammonia consuming unit is a system wherein ammonia is used for catalytic removal of $NO_x$.

3. A system according to claim 2, wherein the catalytic removal of $NO_x$ is a selected catalytic reduction of NO in an oxygen-containing exhaust gas of a combustion engine or a combustion process.

4. A system according to claim 1, wherein the ammonia consuming unit is an internal combustion engine fueled by ammonia.

5. A system according to claim 1, wherein the ammonia consuming unit is a fuel cell capable of using ammonia as a fuel.

6. A system according to claim 1, wherein the ammonia consuming unit is a catalytic reactor decomposing the ammonia into hydrogen and nitrogen.

7. A system according to claim 6, further comprising means for conveying the hydrogen to one or more fuel cells using hydrogen as fuel.

8. A system according to claim 1, further comprising a feeding system for continuous feeding of compacted ammonia absorbing/desorbing solid material into the discharge chamber wherein ammonia is released by thermal desorption.

9. A system according to claim 1, further comprising: a feeding system comprising a number of compartments where each compartment comprises one or more unit(s) of compacted ammonia absorbing/desorbing solid material, which feeding system is adapted to releasing ammonia from the units sequentially by thermal desorption.

10. A system according to claim 1, further comprising means for supplying ammonia to the discharge chamber.

11. A system according to claim 1, wherein said alkali metal is selected from the group consisting of Li, Na, K and Cs.

12. A system according to claim 1, wherein said alkaline earth metal is selected from the group consisting of Mg, Ca and Sr.

13. A system according to claim 1, wherein said transition metal is selected from the group consisting of V, Cr, Mn, Fe, Co, Ni, Cu and Zn.

14. A system according to claim 1, wherein said combinations are selected from the group consisting of NaAl, KAl, $K_2Zn$, CsCu and $K_2Fe$.

* * * * *